(12) United States Patent
Wakabayashi et al.

(10) Patent No.: US 6,733,089 B1
(45) Date of Patent: May 11, 2004

(54) BRAKE ASSEMBLY FOR MOTORCYCLE

(75) Inventors: Takeshi Wakabayashi, Saitama (JP); Kazuhiko Tani, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/419,243

(22) Filed: Oct. 15, 1999

(30) Foreign Application Priority Data

Oct. 15, 1998 (JP) .......................................... 10-293395

(51) Int. Cl.$^7$ ............................................. B60T 13/00
(52) U.S. Cl. ...................... 303/9.64; 188/344; 188/349
(58) Field of Search ............................. 303/9.64, 9.61, 303/9.62; 188/344, 345, 349, 106 P

(56) References Cited

U.S. PATENT DOCUMENTS

| | | | | |
|---|---|---|---|---|
| 5,257,856 A | * | 11/1993 | Ota et al. ................... | 303/100 |
| 5,372,408 A | * | 12/1994 | Tsuchida et al. ........... | 303/9.64 |
| 5,620,237 A | * | 4/1997 | Iwashita et al. ........... | 303/9.64 |
| 5,941,608 A | * | 8/1999 | Campau et al. ........... | 303/113.4 |
| 6,070,949 A | * | 6/2000 | Hariu et al. ................ | 303/9.61 |
| 6,273,523 B1 | * | 8/2001 | Wakabayashi et al. ..... | 303/9.61 |

FOREIGN PATENT DOCUMENTS

| | | | |
|---|---|---|---|
| JP | A7196068 | | 8/1995 |
| JP | 10-236375 | * | 9/1998 |

* cited by examiner

Primary Examiner—Jack Lavinder
Assistant Examiner—Bradley T King
(74) Attorney, Agent, or Firm—Birch, Stewart, Kolasch & Birch, LLP

(57) ABSTRACT

A brake assembly for a motorcycle having a reduced number of components and assembly steps, and a simple control system with no interference between separate hydraulic systems. A brake assembly for a motorcycle provided with a front brake and a rear brake respectively for a front wheel and a rear wheel includes a first brake actuator and second brake actuator. An electronically controlled braking system includes a first actuating amount transmission system extending from the first brake actuating member connected to one of either the front brake or the rear brake for actuating whichever one of the front brake and rear brake that is not connected to the first actuating amount transmission system using an actuator as a result of being input with detection values for each of a first actuating amount detection member for detecting an actuating amount of the first brake actuator and second amount detection member for detecting an actuating amount of the second brake actuator and subjecting them to computation, and outputting control signals to the actuator based on the result of computation.

13 Claims, 3 Drawing Sheets

BRAKE ASSEMBLY FOR MOTORCYCLE

BACKGROUND OF THE INVENTION

1. Field of the Invention

The present invention relates to a brake assembly for a motorcycle provided with a hydraulically driven front wheel brake and rear wheel brake, for relational control of the two brakes.

2. Description of Background Art

A motorcycle brake actuation is carried out using a brake lever provided on the handlebar and a brake pedal provided adjacent to a step. Braking force is distributed to the front wheel brake and rear wheel brake according to the actuation of each of the actuating means.

In Japanese Patent Laid-open Publication No. Hei. 7-196068, for example, an example is disclosed using, partial electronic control. The brake system of this example is shown in FIG. 3.

A front wheel brake 02 and a rear wheel brake 05 are hydraulic brakes. A lever master cylinder 07 is provided on a brake lever of an actuating means. A pedal master cylinder 012 is provided on a brake pedal 011.

A lever hydraulic system 08, extending from the lever master cylinder 07, is connected to the front wheel brake 02, a pedal hydraulic system 013 extending from the pedal master cylinder 012 is connected to one port of the three port type rear wheel brake 05, a hydraulic circuit 014 branching from the pedal hydraulic system 013 is connected to a secondary master cylinder 010, and the output of the secondary master cylinder 010 is connected to the other two ports of the rear wheel brake 05 through a control valve 016.

A brake switch 04 opened and closed by rotation of the brake lever 06 is provided on the brake lever 06. A pressure sensor 041 for detecting hydraulic pressure is provide in the lever hydraulic system 08, a control unit 031 determines a hydraulic pressure to be generated at the secondary master cylinder 010 based on each of the detection signals from the brake switch 040 and the pressure sensor 041, and actuates an actuator 033 via a relay 032, so that the secondary master cylinder 010 generates the hydraulic pressure as determined. These devices constitute an electronic braking system.

When the brake pedal 011 is actuated independently, only the rear wheel brake 05 side is actuated dissociated from the front wheel.

When the brake lever 06 is actuated independently, or at the same time as the brake lever 011, the front wheel brake 02 is actuated by hydraulic pressure of the lever master cylinder 07, and the actuator 033 is actuated based on hydraulic pressure of the lever hydraulic system 08 to generate necessary hydraulic pressure in the secondary master cylinder 010 so that the rear wheel brake is actuated by the control valve 016.

A structure for supplying hydraulic pressure for two hydraulic systems, namely hydraulic pressure for the pedal hydraulic system 013 and hydraulic pressure through the control valve 016 of the electronically controlled secondary master cylinder 010, is provided in the rear wheel brake 05, and there is a need for separate piping for the two systems in the rear brake. Also, the pedal hydraulic system 013 branches into two sections, with pipes leading to the rear wheel brake 05 and to the secondary master cylinder 010, and the control valve 016 is located between the secondary master cylinder 010 and the rear wheel brake 05. This all means that the structure has many components and is complicated, and the operation of installing the piping and also maintenance can not be carried out easily.

The layout of the piping is also subject to restrictions, and there is little degree of freedom in the design.

The rear wheel brake receiving the hydraulic pressure from two systems requires pistons for the respective pressure systems in the brake caliper, and in order to prevent partial contacting of a pad (binding) when each of the pressure systems is independently input, pistons are provided at three places and a caliper structure necessary to separate the systems becomes complicated.

Also, since there are two independent pressure systems in the rear wheel brake, when hydraulic pressure is activated at the same time as simultaneous actuation of the first and second brake actuating means, mutual interference occurs between them and the providing of the actuator 033 and control valve 016 in order to improve this situation is difficult and control is complicated.

SUMMARY AND OBJECTS OF THE INVENTION

The present invention has been conceived in view of the above described problems, and the object of the invention is to provide a brake assembly for a motorcycle that carries out simple control without causing interference between hydraulic systems, and which can reduce the number of components and the number of assembly steps.

In order to achieve the above described object, the present invention provides a brake assembly for a motorcycle provided with a front brake and a rear brake respectively for a front wheel and a rear wheel. The brake assembly comprises first brake actuating means and second brake actuating means, and an electronically controlled braking system, having a first amount transmission system extending from the first brake actuating means connected to one of either the front brake or the rear brake. The electronically controlled braking system drives whichever one of the front brake and rear brake that is not connected to the first amount transmission means using an actuator, in accordance with a control signal output from electronic control means that receives detection values from each of first amount detection means for detecting an actuating amount of the first brake actuating means and second amount detection means for detecting actuating amount of the second brake actuating means and subjecting the values to computation, and outputs the control signal to the actuator based on the result of computation.

If the first brake actuating means is actuated, the front wheel brake is actuated via the first actuating amount transmission system and the actuating amount is detected by the first actuating amount detection means and output to the electronic control means. if the second brake actuating means is actuated, the actuating amount is detected by the second actuating amount detecting means and output to the electronic control means.

The electronic control means carries out computation based on the inputted detected values of the actuating amount, outputs control signals to a hydraulic control actuator, and the front wheel brake and rear wheel brake are actuated in accordance with these control signals.

Accordingly, one of the front wheel brake and the rear wheel brake is actuated via the first actuating amount transmission system, while the other is actuated via the electronically controlled braking system. Since the brakes are respectively actuated by independent systems, there is no interference between them, control is simplified and responsiveness is excellent.

The actuating amount transmission system can also be simplified, the number of components reduced, assembly and maintenance work can be carried out easily, and design freedom for the layout of the transmission system is increased.

The front wheel brake and rear wheel brake have brake caliper pistons arranged at two or less places so the caliper structure is simplified.

The electronically controlled braking system does not utilize mechanical control such as a control valve, which means that degree of freedom of electronic control is increased.

A second aspect of the present invention is a brake assembly of the first aspect described above, in which the first brake actuating means is a lever master cylinder, the second brake actuating means is a pedal master cylinder, the first amount transmission system is connected to a front wheel brake and the actuator actuates a rear wheel brake.

The first actuating amount transmission system connects the lever master cylinder and the front wheel brake and can be designed so as to be short, and the electronically controlled braking system has an actuator arranged close to the rear wheel brake and can also be designed so as to be short.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

An embodiment of the present invention will now be described in the following with reference to FIG. 1 and FIG. 2.

Figure 1:
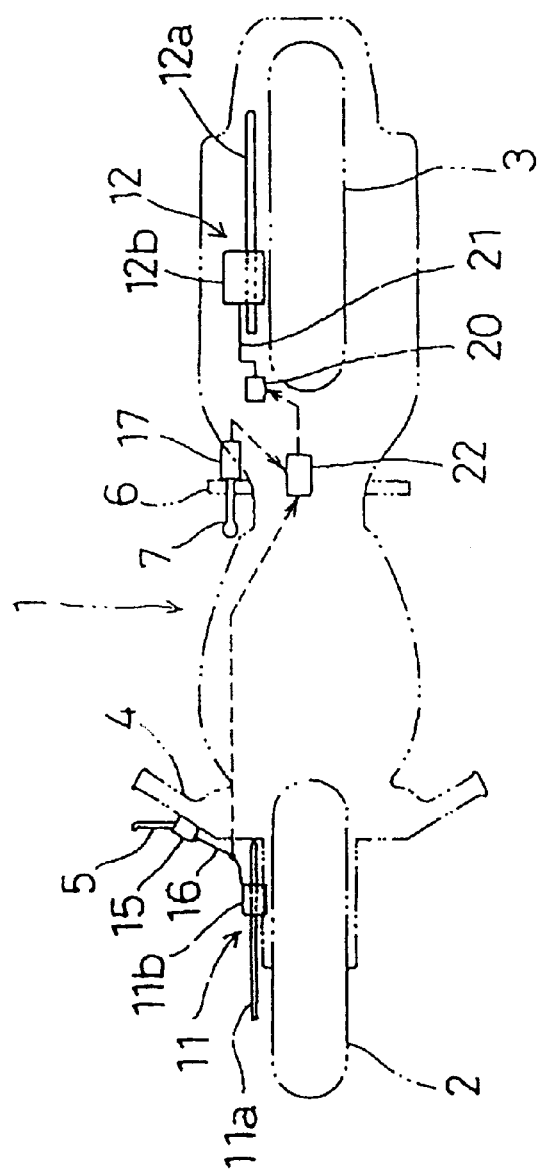
FIG. 1 is a schematic diagram showing a braking system for a motorcycle adopting the brake assembly of an embodiment of the present invention.
Figure 2:
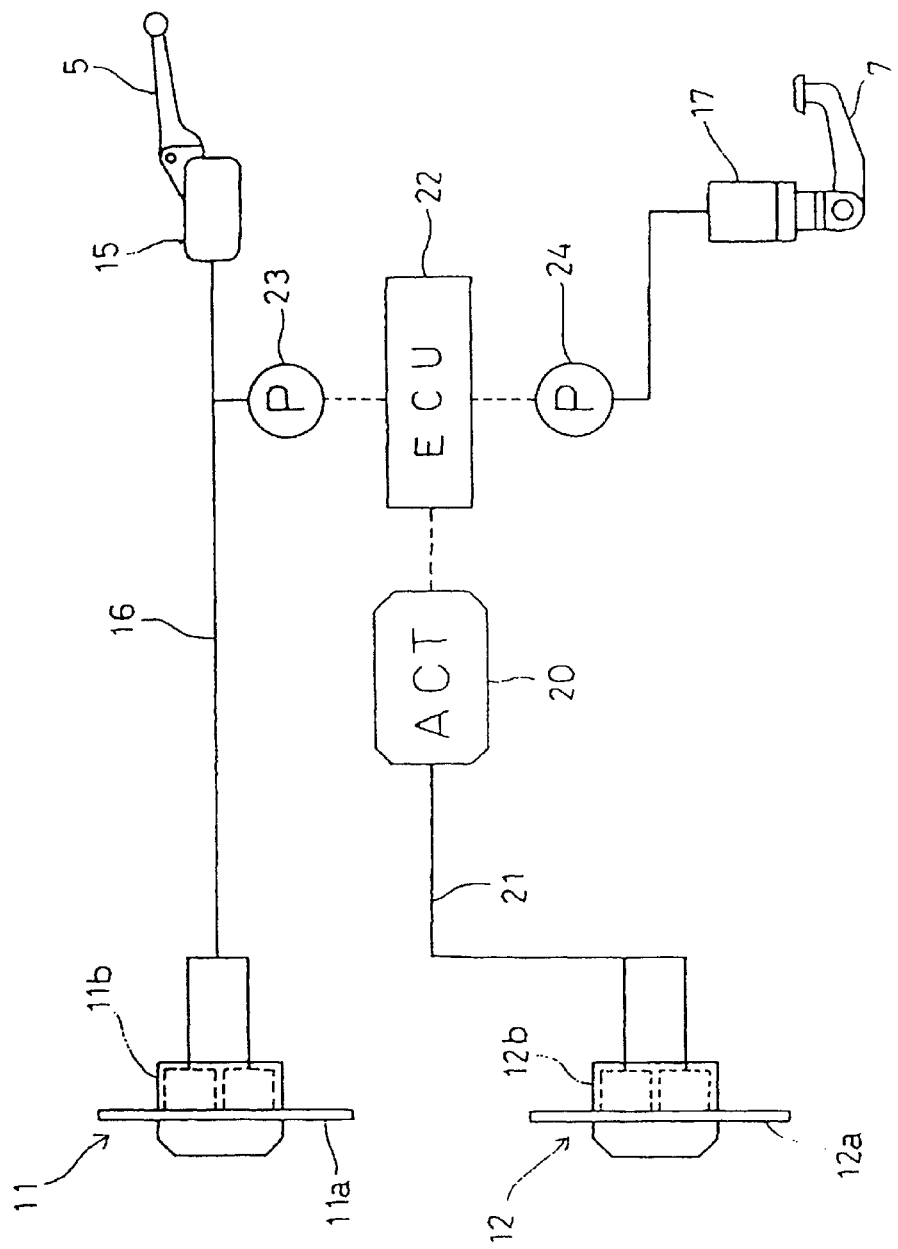
FIG. 2 is a structural diagram of this braking system.
Figure 3:
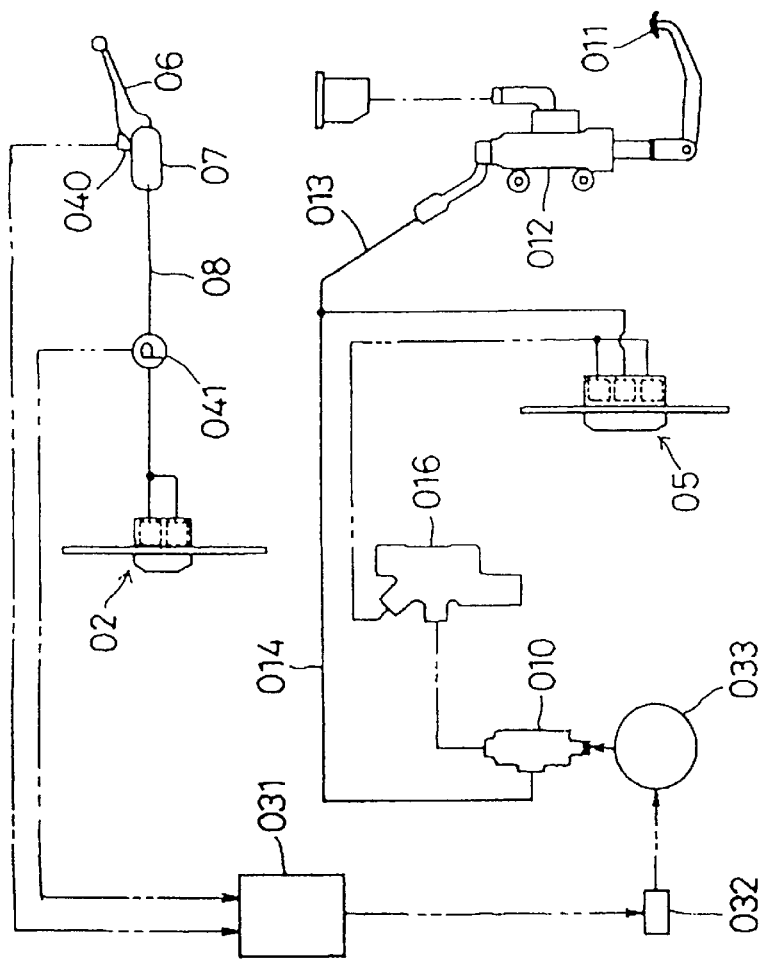
FIG. 3 is a structural diagram of a braking system of a conventional brake assembly.

FIG. 1 is a schematic diagram showing a braking system for a motorcycle adopting the brake assembly of an embodiment of the present invention.

A hydraulic pressure type front wheel brake 11 is provided on a front wheel 2, and a hydraulic pressure type rear brake 12 is also provided on the rear wheel 3.

Both the front and rear brakes are disk brakes, comprising brake disks 11a and 12a, and brake calipers 11b and 12b.

A brake lever 5 is located on the right side handlebar, while a brake pedal 7 is located close to a right side step.

The brake lever 5 is attached to a lever master cylinder 15, and the brake pedal 7 is attached to a pedal master cylinder 17.

Piping of a lever hydraulic system 16 extending from the lever master cylinder 15 is connected to the brake caliper 11b of the front wheel brake 11.

An electronically controlled actuator 20 is arranged close to the rear wheel brake 12, and the electronically controlled actuator 20 and the brake caliper 12b of the rear wheel brake 12 are connected by piping 21 of the electronically controlled actuator 20.

The electronically controlled actuator 20 is controlled by an electronic control unit (ECU) 22. Respective actuating hydraulic pressure detection signals of the lever master cylinder 15 and the pedal master cylinder 17 are input to the ECU 22.

The structure of the brake system described above is shown in FIG. 2.

A hydraulic pressure sensor 23 is provided in the lever hydraulic system 16, and the hydraulic pressure sensor 23 detects actuation pressure generated in the lever master cylinder 15 by actuation of the brake lever 5 and outputs a detection signal to the ECU 22.

A hydraulic pressure sensor 24 provided in the pedal master cylinder 17 detects actuation pressure generated in the pedal master cylinder 17 by actuation of the brake pedal 7 and outputs a detection signal to the ECU 22.

The front wheel brake 11 has a two port type caliper 11b with two pistons, and the lever hydraulic system 16 is connected to both ports.

Similarly, the rear wheel brake 12 is also a two port type, with the electronically controlled actuator 20 being connected to both ports via piping 21.

The brake assembly of the present invention has the following structure.

If the brake pedal 7 is independently actuated, the pressure sensor 24 detects the pedal actuating pressure and outputs it to the ECU 22. The ECU then carries out computation based on this detection signal, outputs a control signal to the electronically controlled actuator 20, and supplies hydraulic pressure to the brake caliper 12b using the electronically controlled actuator 20.

Thus, if the brake pedal 7 is independently actuated, hydraulic pressure is supplied to the rear wheel brake 12 under the control of the electronically controlled braking system, and only the rear wheel 3 is braked.

If the brake lever 5 is independently actuated, hydraulic pressure is supplied to the front wheel brake 11 through the lever hydraulic system and the front wheel 2 is braked, and at the same time the pressure sensor 23 detects the lever actuating pressure and outputs it to the ECU 22. Hydraulic pressure is then supplied to the rear wheel brake 12 by the electronically controlled braking system based on this detection signal, the rear wheel 3 is also controlled so as to be braked at an appropriate pressure and timing. Braking force is thus applied in a suitably distributed manner to the front wheel 2 and the rear wheel 3.

If the brake lever 5 and the brake pedal 7 are actuated at the same time, hydraulic pressure is supplied directly to the front wheel brake 11 through the lever hydraulic system to brake the front wheel 2, and at the same time the ECU 22 is input with lever actuation pressure and pedal actuation pressure detection signals and carries out computation. Based on the computation results, control signals are output to the electronically controlled actuator 20, the electronically controlled actuator 20 actuates the rear wheel brake 12, the rear wheel is braked at an appropriate pressure and braking force is applied in a suitably distributed manner to the front wheel 2 and the rear wheel 3.

The front wheel brake 11 is provided with hydraulic pressure by the lever hydraulic system 16 and the rear wheel brake 12 is supplied with hydraulic pressure by the electronically controlled actuator 20, and are respectively actuated by independent systems. This means that there is no interference between the two hydraulic pressures, control is simplified and responsiveness is extremely good.

The lever hydraulic system 16 is connected between the lever master cylinder 15 and the front wheel brake 11 and the amount of piping can be reduced. The electronically controlled actuator 20 is also arranged close to the rear wheel brake 12 so that the amount of piping 21 can be reduced, the lubrication system piping is simplified, the number of components is reduced and piping and maintenance operations are made easy. It is also possible to increase the degree of freedom with respect to the layout of the piping.

Further, the front wheel brake 11 and rear wheel brake 12 have pistons of the brake calipers 11b and 12b arranged at two or less places so the caliper structure is simplified.

The electronically controlled braking system does not utilize mechanical control such as a control valve, which means that the degree of freedom of the electronic control is increased.

The electronically controlled braking system of the embodiment described functions with a rear wheel brake. However, by making it function with a front wheel brake the lever hydraulic system 16 can be removed, and the pedal hydraulic system extending from the pedal master cylinder 17 can be connected to the front wheel brake 11.

With this structure also, the piping is short, piping for the hydraulic system is simplified, the number of components is reduced and piping and maintenance operations are made easier. There is also an increased freedom with respect to the electronic control.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A brake assembly for a motorcycle provided with a front brake and a rear brake respectively for a front wheel and a rear wheel, comprising:

first brake actuating means and second brake actuating means, the first brake actuating means and the second actuating means being separately operable by a user; and an electronically controlled braking system having a first actuation amount detection means extending from the first brake actuating means and connected to one of either the front brake or the rear brake;

electronic control means receiving detection values from each of a first actuation amount detection means for detecting an actuation amount of the first brake actuating means, and second actuation amount detection means for detecting an actuation amount of the second brake actuating means, subjecting the detection values to computation, and outputting a control signal to an actuator based on a result of the computation, the actuator driving whichever one of the front brake and rear brake that is not connected to the first actuation amount detection means in response to the control signal, wherein the brake assembly lacks a hydraulic system between the second actuating means and said one of the front and rear brake that is not connected to the first actuation amount detection means.

2. The brake assembly for a motorcycle according to claim 1, wherein the first brake actuating means is a lever master cylinder, the second brake actuating means is a pedal master cylinder, the first actuation amount detection means is connected to said front brake and the actuator drives said rear brake.

3. The brake assembly for a motorcycle according to claim 1, and further including a second actuation amount detection means connected to the other of the rear brake or the front brake and said electronic control means receiving a detection value from said second actuation amount detection means for detecting an actuation amount of the second brake actuating means, subjecting the value to computation, and outputting a control signal to an actuator based on the result of computation, the actuator driving whichever one of the front brake and rear brake that is not connected to the first actuation amount detection means in response to the control signal.

4. The brake assembly for a motorcycle according to claim 1, wherein said first actuation detection means includes a hydraulic pressure sensor for sensing the pressure generated during braking and for outputting a detection signal to said electronic control means.

5. The brake assembly for a motorcycle according to claim 3, wherein said second actuation detection means includes a hydraulic pressure sensor for sensing the pressure generated during braking and for outputting a detection signal to said electronic control means.

6. The brake assembly for a motorcycle according to claim 1, wherein upon only braking the front brake, the front brake is actuated and a pressure sensor sends a signal to said electronic control means and, based on the computation results, the rear brake is braked at an appropriate pressure while a braking force is applied in a suitable distributed manner to the front brake.

7. The brake assembly for a motorcycle according to claim 1, wherein actuating the front brake and the rear brake at the same time actuates the front brake and the rear brake and pressure sensors send a signal to said electronic control means and, based on the computation results, the rear brake is braked at an appropriate pressure and braking force is applied in a suitable distributed manner to the front brake.

8. A brake assembly for a motorcycle provided with a front brake and a rear brake respectively for a front wheel and a rear wheel, comprising:

first brake actuating means and second brake actuating means, the first brake actuating means and the second actuating means being separately operable by a user; and an electronically controlled braking system having a first actuation amount detection means extending from the first brake actuating means and connected to the front brake and a second actuation amount detection means extending from the second brake actuating means and connected to the rear brake;

electronic control means receiving detection values from either or both of the first actuation amount detection means for detecting an actuation amount of the first brake actuating means and the second actuation amount detection means for detecting an actuation amount of the second brake actuating means and subjecting the values to computation and outputting a control signal to said actuator based on the result of computation, the rear brake being provided with an actuating force by an electronic controlled hydraulic system having piping and lacking a mechanical control valve, the piping directly connecting the actuator to the rear brake, and the rear brake being not connected to the first actuation amount detection means, the front brake being provided with an actuating force by a lever hydraulic system, wherein said electronic controlled hydraulic system which provides said actuating force to the rear brake is independent from said lever hydraulic system which provides said actuating force to the front brake, wherein the brake assembly lacks a hydraulic system b,between the second actuating means and said brake that is not connected to the first actuation amount detection means.

9. The brake assembly for a motorcycle according to claim 8, wherein the first brake actuating means is a lever master cylinder, the second brake actuating means is a pedal master cylinder, the first actuation amount detection means is connected to said front brake and the actuator drives said rear brake.

10. The brake assembly for a motorcycle according to claim 8, wherein said first actuation detection means includes a hydraulic pressure sensor for sensing the pressure generated during braking and for outputting a detection signal to said electronic control means.

11. The brake assembly for a motorcycle according to claim 8, wherein said second actuation detection means includes a hydraulic pressure sensor for sensing the pressure generated during braking and for outputting a detection signal to said electronic control means.

12. The brake assembly for a motorcycle according to claim 8, wherein upon only braking the front brake, the front brake is actuated and a pressure sensor sends a signal to said electronic control means and, based on the computation results, the rear brake is braked at an appropriate pressure while a braking force is applied in a suitable distributed manner to the front brake.

13. The brake assembly for a motorcycle according to claim 8, wherein actuating the front brake and the rear brake at the same time actuates the front brake and the rear brake and pressure sensors send a signal to said electronic control means and, based on the computation results, the rear brake is braked at an appropriate pressure and braking force is applied in a suitable distributed manner to the front brake.

* * * * *